United States Patent
Dwelley et al.

(10) Patent No.: US 9,535,437 B1
(45) Date of Patent: Jan. 3, 2017

(54) POWER OVER ETHERNET POWER SOURCING EQUIPMENT PROVIDES LOW VOLTAGE OUTPUT FOR INCREASED EFFICIENCY IN LOW POWER MODE

(71) Applicant: Linear Technology Corporation, Milpitas, CA (US)

(72) Inventors: David Dwelley, Santa Barbara, CA (US); Jeffrey Heath, Santa Barbara, CA (US); Kirk Su, Santa Barbara, CA (US)

(73) Assignee: Linear Technology Corporation, Milpitas, CA (US)

( * ) Notice: Subject to any disclaimer, the term of this patent is extended or adjusted under 35 U.S.C. 154(b) by 426 days.

(21) Appl. No.: 14/054,516

(22) Filed: Oct. 15, 2013

Related U.S. Application Data

(60) Provisional application No. 61/714,057, filed on Oct. 15, 2012.

(51) Int. Cl.
  *G05F 1/10* (2006.01)
  *H04L 12/24* (2006.01)
  *B60R 16/03* (2006.01)
  *H04L 12/10* (2006.01)

(52) U.S. Cl.
  CPC .............. *G05F 1/10* (2013.01); *B60R 16/03* (2013.01); *H04L 12/10* (2013.01); *H04L 41/0681* (2013.01)

(58) Field of Classification Search
  CPC .................................. G05F 1/10; H04L 12/10
  USPC ............................................................. 307/1
  See application file for complete search history.

(56) References Cited

U.S. PATENT DOCUMENTS

| | | | | |
|---|---|---|---|---|
| 8,793,511 B1* | 7/2014 | Bishara | ............... | G06F 1/266 713/300 |
| 2006/0019629 A1* | 1/2006 | Berson | ............... | H04M 19/08 455/402 |
| 2006/0164774 A1* | 7/2006 | Herbold | ............... | H04L 12/10 361/93.1 |
| 2007/0170909 A1* | 7/2007 | Vorenkamp | ........... | G06F 1/266 324/76.11 |
| 2007/0260904 A1* | 11/2007 | Camagna | ............. | H04L 12/10 713/310 |
| 2010/0205466 A1* | 8/2010 | Diab | ............... | H04L 12/40045 713/310 |
| 2011/0258465 A1* | 10/2011 | Diab | ............... | H04L 12/10 713/300 |

* cited by examiner

*Primary Examiner* — Jung Kim
*Assistant Examiner* — James Evans
(74) *Attorney, Agent, or Firm* — Patent Law Group LLP; Brian D. Ogonowsky

(57) ABSTRACT

In a PoE system in an automobile, Power Source Equipment (PSE) is connected to Powered Devices (PDs) to provide data and power via Ethernet wires. When the ignition switch is on, the full PSE voltage, such as 44 volts, is supplied to the PDs, and the voltage is regulated by the PDs to power one or more loads in the PD. During a standby mode, such as when the ignition switch is off, the PSE is controlled to output a lower voltage of, for example, 5 volts, and the voltage is regulated by the PDs to power the loads, such as processors, in a low power standby mode. The voltage regulator in the PD for the low power mode may be an efficient linear regulator, and the voltage regulator in the PD for the full voltage mode may be a switching regulator. Thus, there is improved efficiency.

17 Claims, 13 Drawing Sheets

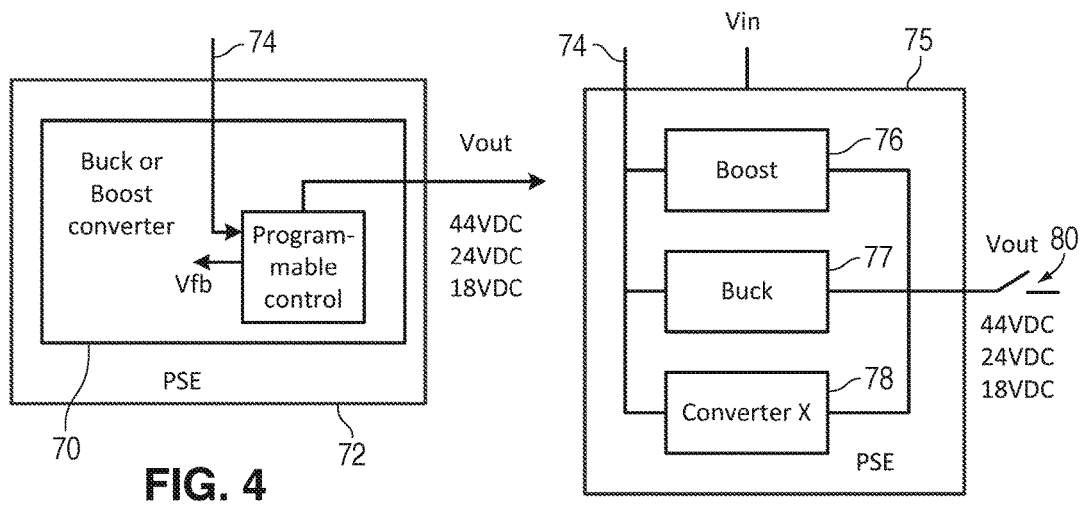
FIG. 4
FIG. 5A
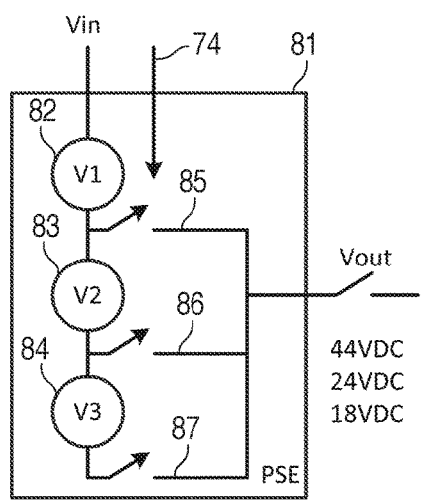
FIG. 5B

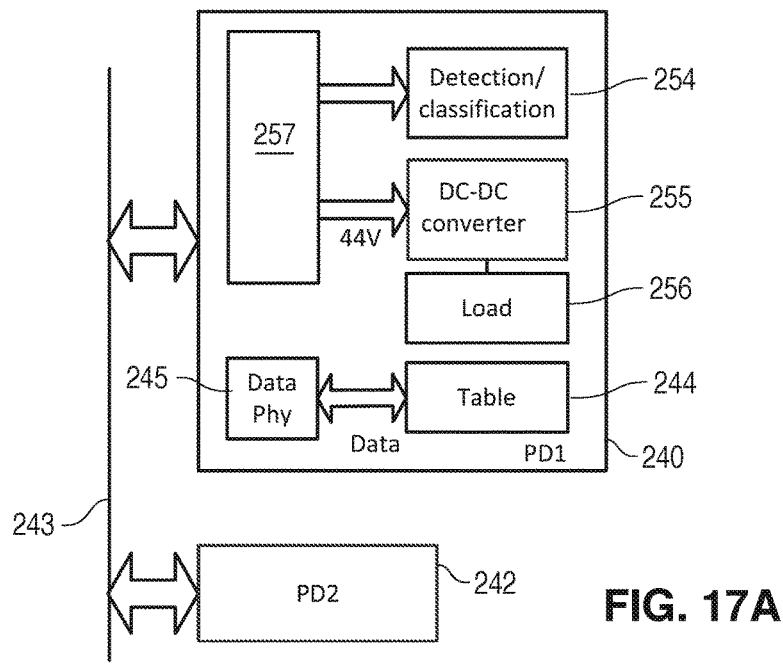

FIG. 17A

PD logic transmits first set of "allowable" multi-level symbols (analog) on bus. Each allowable symbol function is identified in table(s) for operation by a receiving PD. —246

The symbol table includes a second set of multi-level symbols that are disallowed symbols which are not proper for any PD to transmit. Some disallowed symbols (having multi-voltage levels) are voltage sums of two or more allowed symbols. —248

If two or more PD transmit allowable symbols on bus at same time, the combination of the transmitted symbols equals a disallowed symbol —250

If a disallowed symbol is detected by PD, ignore symbol and retransmit allowable symbol using collision avoidance routine (e.g., randomize retransmission delay, etc.) —252

FIG. 17B

POWER OVER ETHERNET POWER SOURCING EQUIPMENT PROVIDES LOW VOLTAGE OUTPUT FOR INCREASED EFFICIENCY IN LOW POWER MODE

CROSS-REFERENCE TO RELATED APPLICATIONS

This application is based on and claims priority from U.S. Provisional Application Ser. No. 61/714,057, filed Oct. 15, 2012, by David Dwelley and Jeffrey Heath, incorporated herein by reference.

FIELD OF THE INVENTION

This invention relates to systems, such as Power Over Ethernet (PoE), where power is transmitted over data lines.

BACKGROUND

It is known to transmit power over data lines to power remote equipment. Power Over Ethernet (PoE) is an example of one such system. In PoE, limited power is transmitted to Ethernet-connected equipment (e.g., VoIP telephones, WLAN transmitters, security cameras, etc.) from an Ethernet switch. DC power from the switch is transmitted over two sets of twisted pair wires in the standard CAT-5 cabling. The same two sets of twisted pair wires may also transmit differential data signals, since the DC common mode voltage does not affect the data. In this way, the need for providing any external power source for the "Powered Devices" (PDs) can be eliminated. The standards for PoE are set out in IEEE 802.3, incorporated herein by reference.

Providing power over data lines is applicable to other existing systems and future systems. For example, electronic equipment in automobiles will increasingly benefit from power to the equipment being provided over the data lines to reduce wiring. Various new systems using power over data lines may be standardized by the IEEE or other groups.

Such systems using power over data lines may or may not require handshaking protocols.

Although some of the present inventions may be applied to any system using power over data lines, a typical PoE system will be described as an example.

FIG. 1 represents a typical Ethernet system using PoE. In the example of FIG. 1, a "Power Sourcing Equipment" (PSE) 12 may be any Ethernet device that supplies power and data to a PD. The PSE 12 and PD 14 are typically connected via a standard CAT-5 cable terminated with the standard Ethernet 8-pin (four twisted pairs) connector. Only two of the twisted pairs are typically needed for PoE and data.

The PSE 12 is typically powered by the mains voltage (120 VAC) and uses either an external or internal voltage converter 16 to generate a DC voltage between 44-57 volts. The PoE standards require the PoE to supply a minimum of 37 volts at the PD. The voltage drop along the cable increases with distance.

Two of the twisted pairs 18 and 20 are assigned to carry the PoE power, and these pairs may also carry differential data. The remaining two pairs are also shown. All pairs in use are terminated at the PD 14 by transformers, such as transformers 22 and 24. It is assumed that the twisted pair 18 provides 44 volts and the twisted pair 20 is connected to ground. A connection is made to the center tap of transformers 22 and 24 to provide the 44 volts to the PD 14. Since the DC voltage is common mode, it does not affect the differential data. Other conventional termination circuitry is also included in the termination block 25, such as polarity correction circuitry, but is not relevant to the present inventions.

The 44 volts is applied to a DC-DC converter 26 for converting the voltage to any voltage or voltages required by the PD 14. The load 28 (e.g., a security camera) is powered by the converter 26 and communicates with the PSE 12 via the twisted wire pairs.

The IEEE standards require certain low current handshaking procedures between the PSE 12 and PD 14 in order to detect the presence of a PoE-powered device and in order to convey the pertinent characteristics of the PSE 12 and PD 14 prior to the PSE 12 making the full power available to the PD 14.

Below is a simplified summary of the handshaking protocol between the PSE 12 and the PD 14.

When a PoE-enabled Ethernet cable is plugged into the PD 14, the PSE 12 interrogates the PD 14 to determine if it is PoE-enabled. This period is termed the detection phase. During the detection phase, the PSE 12 applies a first current limited voltage for a fixed interval to the PD 14, via the twisted wire pairs 18 and 20, and then applies a second current limited voltage for a fixed interval, while looking for a characteristic impedance of the PD 14 (about 25K ohms) by detecting the resulting current. If the correct impedance is not detected, the PSE 12 assumes that the load is not PoE-enabled and shuts down the PoE generating end. The system then operates as a standard Ethernet connection.

If the signature impedance is detected, the PSE 12 moves on to an optional classification phase. The PSE 12 ramps up the voltage to the PD 14. The PSE 12 generates either one pulse (indicating it is a Type 1 PSE) or two pulses (indicating it is a Type 2 PSE). The PD 14 responds to the classification pulses with certain current levels to identify whether the PD 14 is Type 1 or Type 2. A Type 1 PD requires less than 13 W. A Type 2 PD requires up to a maximum of 25.5 W. Various classes (e.g., five classes), each associated with a maximum average current level and a maximum instantaneous current level, within these types may also be identified. A classification resistance may be used. The PSE 12 then may use this power demand information to determine if it can supply the required power to the PD 14, and the PD 14 uses the information to determine if it can fully operate with the PSE 12. There are maximum time windows for the detection and classification phases (e.g., 500 ms).

Other types of detection and classification routines and standards may be implemented in the future.

On completion of the detection and classification phases, the PSE 12 ramps its output voltage above 42 V. Once an under-voltage lockout (UVLO) threshold has been detected at the PD 14, an internal FET is turned on. At this point, the PD 14 begins to operate normally, and it continues to operate normally as long as the input voltage remains above a required level.

There are various opportunities in Ethernet systems and other systems for performing additional and alternative functions during the handshaking phase, if any, and various other opportunities for performing additional and alternative functions during the normal operation of the PD.

Many of these opportunities arise as a result of such systems being used in automobiles, where the powered components are predetermined by the automobile manufacturer. Thus, it is unlikely that an incompatible part will be connected to a socket in the automobile. Further, automobiles may use a shared data/power bus to connect many PDs to a central switch, rather than use separate cables, to minimize wiring.

One problem when powering equipment using PoE is that the PoE outputs its full voltage irrespective of the voltage needs of the load. When a load only requires a low voltage, much lower than the full PoE voltage, there is considerable power wasted in the PD's power conversion circuitry converting the full PoE voltage to the low load voltage. In one example, the load (in the PD) may only require 5 volts and a few milliamps in a standby mode yet require the full PoE voltage in its fully operational mode. The standby mode may be much longer than the fully operational mode. Therefore, what is needed is a PoE system that is more efficient for loads that may require a much lower voltage than the full PoE voltage.

The terms PSE and PD are used throughout this disclosure to identify equipment that supplies power and equipment that receives the power, and such equipment/devices are not limited to Ethernet equipment/devices.

SUMMARY

In one embodiment, the invention is used in an automobile that may have a 12 volt battery. The battery voltage may be boosted to the standard PoE voltage of about 44 volts, or the PoE system in the automobile may be adapted to provide a maximum voltage of 12 volts.

Ethernet communications in automobiles and PoE in automobiles will become more and more common as the electrical systems become more complex. Some of the PDs connected to the automobile's PoE system will communicate data over an Ethernet bus and will require power from the Ethernet bus. Some of the PDs may be systems that have a low voltage/standby mode that is used when the ignition switch is off. Such a standby mode may be for a PD that includes a processor, where the standby mode enables the processor to remain fully booted up to avoid a delay when the automobile is later activated by turning on the ignition.

In one example, the turning off or on of the ignition switch automatically controls whether the PD goes into its standby mode or wakes up from its standby mode. In one example, the turning off of the ignition switch causes the automobile's host system to transmit a signal to the PSE to cause the PSE voltage source to output a relatively low voltage (e.g., 5 volts) equal to or slightly higher than what is needed by the PD in its standby mode. The PSE may also command the PD to go into its standby mode, or the low voltage automatically causes the PD to enter its standby mode. Alternatively, the PD may sense a different signal to enter the standby mode. The host signal or a PD signal may even program the PSE to provide any of a plurality of possible voltages.

The low voltage may then be converted to the necessary voltage used by the PD for the standby mode. In one embodiment, a low drop out (LDO) regulator (also known as a linear regulator) in the PD is used for the standby mode, which is generally more efficient than a switching regulator when the input voltage is close to the regulated output voltage. When the ignition switch is turned on, the host may transmit a signal to the PSE to control the PSE to provide the full voltage, and the PD comes out of the standby mode. The regulated voltage to the higher current load in the PD may then be supplied by a switching regulator in the PD, which is generally more efficient than an LDO regulator at the higher currents and where there is a larger voltage differential.

The invention is not limited to automobiles or standby modes.

The particular embodiments to which the present claims are directed are described below under the section entitled, PSE Provides Low Voltage Signal To PD During a Standby Mode of the PD To Improve Efficiency.

Various other techniques are disclosed herein that add functionality to systems where power is provided over data lines. Some of these techniques occur during the handshaking periods between the PSE and the PD. Some of the techniques are particularly suitable for Ethernet and non-Ethernet systems in automobiles where the PSEs and PDs are predetermined by the automobile manufacturer so that the handshaking may be abbreviated or dispensed with. The various techniques may be compatible with the current IEEE standards for PoE and anticipated future IEEE standards.

Techniques are disclosed that:

Enable systems that supply power over data lines to be used in automobiles by providing a boost converter in the PSE to boost the 12 volt battery voltage to, for example, the 44-57 volts required by the IEEE PoE standards;

Limit in-rush current into a PD or a PSE when the PD or PSE is connected to a power bus that may supply power to other PDs or PSEs, thus enabling hot-swapping;

Enable the programming of the PSE or PD power supply output voltage level for accommodating different types of PDs;

Enable the PSE to detect the actual voltage at the PD despite an unpredictable voltage drop along the cable;

Enable non-standard functions to be performed during the allowable handshaking period when power-requirement information is already known about the PSE and PD;

Enable the handshaking delay to be avoided at each powering up time by storing previously detected handshaking information in a memory;

Provide a specified low voltage by the PSE to the PD when requested, such as during a low power standby mode of the PD, that can be regulated by an efficient (at low power) low dropout (LDO) regulator in the PD instead of a less efficient switching mode regulator;

Enable the PSE to determine whether there are no PDs on a bus or any number of PDs on the bus;

Enable power to be transmitted to a PD using only one twisted wire pair of the data cable (e.g., Ethernet cable);

Provide a security feature that detects if a PD is connected to a proper PSE and, if no detection, prevents operation of the PD;

Provide a security feature that periodically detects if a PD has been removed from the system and, if so, initiates a security routine;

Provide a low power standby path in the PD to supply power to low power quiescent circuitry (e.g., memory, processor, etc.) in the PD to avoid delays in starting up such circuitry;

Enable fast collision detection on a data bus by detecting the sums of combined signals on the bus; and Enable fast terminating of traffic on a data bus in the event that a high priority message needs to be sent by summing concurrently transmitted signals to create an emergency "ALL STOP" signal. The high priority message is then sent.

Various other embodiments are described.

BRIEF DESCRIPTION OF THE DRAWINGS

FIG. 4 illustrates a programmable boost and/or buck converter in a PSE or PD.

FIG. 5A illustrates one method for supplying a programmable output voltage of the PSE or PD.

FIG. 5B illustrates another method for supplying a programmable output voltage of the PSE or PD.

FIGS. 17A, 17B, and 17C illustrate how the signals from multiple PDs connected to a power bus may be summed and the summed signals detected to determine whether a collision has occurred, requiring retransmission.

Elements that are the same or equivalent are labeled with the same numeral.

DETAILED DESCRIPTION

The various circuits shown represent the pertinent aspects of a system, such as a PoE-enabled Ethernet system, where power is supplied over data lines.

It is predicted that more and more of an automobile's electrical system will conduct data and power via a shared bus, such as a PoE-enabled Ethernet bus. The systems may have to conform to IEEE standards for compatibility. Using a shared data and power bus reduces wiring and allows a central means of monitoring the status of the various systems. Many other benefits can be realized. Accordingly, new techniques that are directed to such automobile applications are very valuable. The techniques described herein are also applicable to non-automobile applications.

Boost Converter in PSE for Automobile Applications

A typical PSE receives power from the mains voltage (120 VAC) and contains (or uses) a step down regulator to provide voltage to the PD, such as the 44-57 VDC standard voltage for PoE. For automobile applications, the power supply is typically a 12 volt battery; however, other battery voltages are also used and anticipated in the future.

Figure 1:
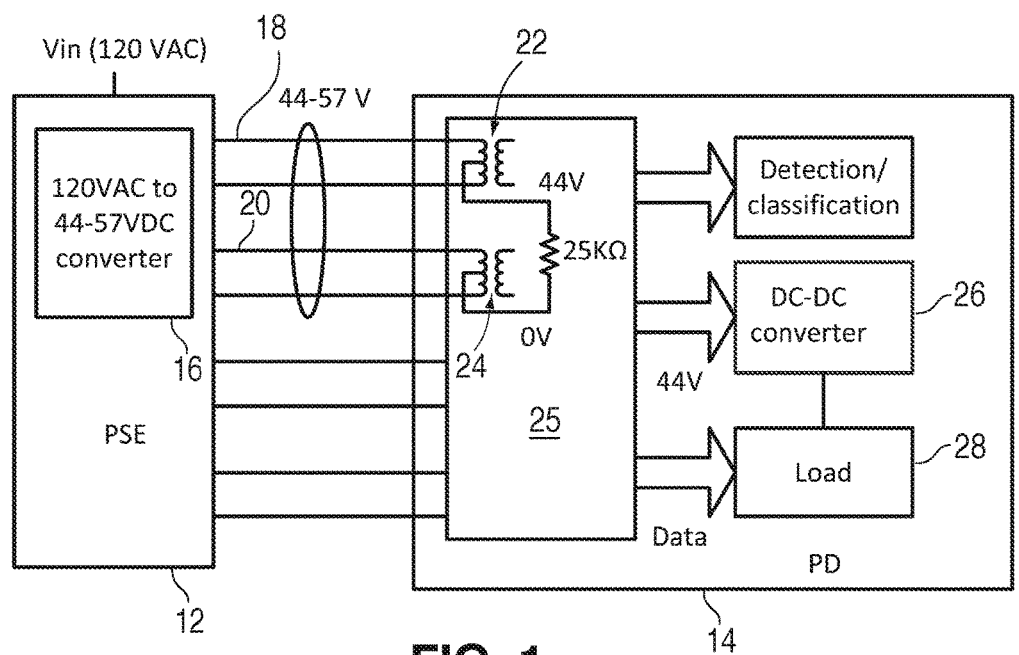
FIG. 1 illustrates a conventional PoE-enabled Ethernet system.
Figure 2:
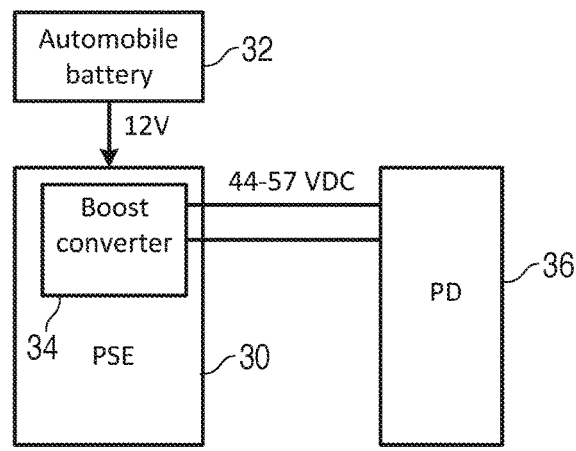
FIG. 2 illustrates a PSE with a boost converter for converting an automobile's 12 volt supply to, for example, the standard 44-57 volt PoE supply.

FIG. 2 illustrates a PSE 30 receiving power from an automobile's 12 volt battery 32. Any type of boost converter 34 is employed in the PSE 30 for converting the 12 volts to a boosted output voltage, such as 24 volts or the standard 44-57 volt PoE supply. The PSE 30 may be connected to a PD 36 in the automobile using a cable or a bus. If the system is an Ethernet system, the conventional PoE protocols and data communication may then be in accordance with the IEEE standards or in accordance with the other techniques described herein. The PD 36 may be any load in the automobile which uses power over data lines.

For automobiles with power supplies other than 12 volts, the converter 34 boosts the supply voltage to any desired voltage.

Soft Start Circuit in PD or PSE Converter for Hot-Swapping

Figure 3:
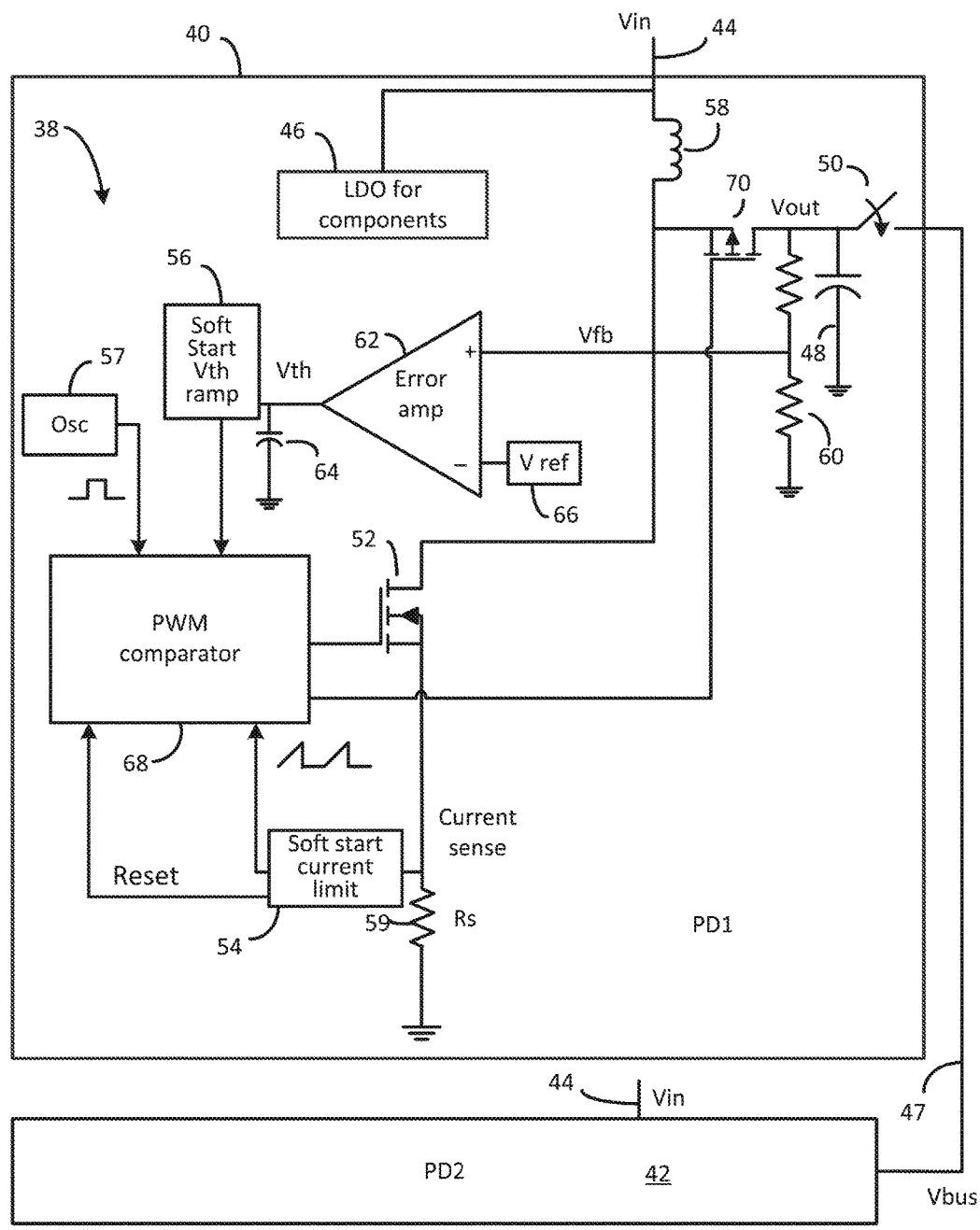
FIG. 3 illustrates a DC-DC converter in a PD or PSE having a soft-start circuit for limiting in-rush current when the PD or PSE is hot-swap-connected to a power bus. The converter may be a step up or step down converter.

FIG. 3 illustrates one of the possible embodiments of a DC-DC converter 38 in a PD 40, where the converter 38 has a soft-start circuit for limiting in-rush current from a power bus 44 supplying an input voltage Vin, such as an Ethernet bus, when the PD 40 is hot-swap-connected to the bus 44. The converter 38 in the example is a boost converter but may instead be a step down converter. The converter 38 may be transformer-isolated from the input voltage source. Hot-swapping refers to the ability to replace a part without having to shut down the system. The ability to hot-swap enables, among other things, redundancy and high reliability. Multiple PDs 40 and 42 are shown in FIG. 3 connected to the bus 44, where the shared power/data cables are illustrated by a single line for simplicity. In the example of PoE, the PoE cables are typically two twisted wire pairs.

During a hot-swap event, an initially un-powered PD 40 is plugged into a socket, connected to the bus 44, which then supplies Vin (e.g., 44 volts) to the PD's converter 38 for powering up the PD 40. It is assumed that there are other PDs on the bus 44 already connected to Vin. It is important that there be no significant transients on the bus 44 (such as a lowering of bus voltage due to in-rush currents) when a PD is plugged in, since a sudden drop in Vin may cause the other PDs connected the bus 44 to not operate properly.

The Vin is applied to a low power LDO 46 (or other converter) in the PD 40 for supplying a low operating voltage (e.g., 5 volts) to the various components forming the control portion of the converter 38.

If a conventional PD 40 were simply plugged into the bus 44, already powering PDs on the bus, the converter 38 would initially draw the maximum current at a 100% duty cycle to quickly ramp up its output voltage Vout to the nominal voltage. This in-rush current would temporarily lower the voltage Vin on the bus 44 and possibly cause the other PDs connected to the bus 44 to enter their undervoltage lockout mode.

To limit the in-rush current into the converter 38 from the bus 44 supplying Vin when a PD is first connected to the bus 44, a soft start circuit is provided in the converter 38 to limit the duty cycle. Such a soft start circuit may directly limit the current through the power MOSFET 52, as shown by the soft start current limit circuit 54, or the soft start circuit may limit the threshold voltage Vth, as shown by the soft start Vth ramp circuit 56. The level of Vth directly determines the duty cycle of the MOSFET 52. The circuit 56 relatively slowly ramps up Vth to limit the duty cycle to avoid any transients in the Vin supply. The soft start circuit has no effect after the output voltage has reached its nominal voltage.

Briefly, the MOSFET 52 is turned on at the beginning of a switching cycle, clocked by an oscillator 57. This charges the inductor 58 and conducts a ramping current through a current sense resistor 59. The level of Vout is fed back as a feedback voltage Vfb by a resistor divider 60 or a third winding of an isolation transformer. An error amplifier 62 (a transconductance amplifier) and capacitor 64 generate a threshold voltage Vth necessary to keep Vfb equal to a reference voltage Vref 66. When the ramping voltage across the resistor 59 crosses Vth, a PWM comparator 68 turns off the MOSFET 52 and turns on a synchronous rectifier MOSFET 70. The inductor 58 is then discharged to charge the output capacitor 48. When Vout is close to the desired output voltage, no more current limiting is required. Other soft start circuits and techniques are envisioned.

In the event that the PD 40 was hot-swap connected to a common output 47, the output capacitor 48, for smoothing ripple, should be prevented from drawing an in-rush current from the output bus 47. When Vout is detected to be approximately equal to the voltage on the bus 47, the hot-swap switch 50 is closed to connect the converter 38 to the bus 47.

In another embodiment, the soft start circuitry is incorporated into the converters of PSEs (rather than PDs) so that hot-swapping of a PSE to a power supply bus does not cause a transient that temporarily lowers the bus voltage. In such an embodiment, the bus 44 supplying Vin may be connected to a battery.

Many other types of converters may be used, including step down converters.

Programmable Voltage Converter in PSE or PD

Although the current IEEE standard for PoE is 44-57 volts, future standards may allow for different ranges of voltages. For non-PoE systems, any output voltage may be specified. Therefore, in future PoE systems and in non-PoE systems, the PDs may use input voltages such as 12, 18, or 24 volts. In order for a single PSE to be usable for a variety of PDs with different input voltage requirements, the PSE's internal converter may be programmable by external signals or by other means.

FIG. 4 illustrates a programmable boost and/or buck converter 70 in a PSE 72. The output voltage Vout may be programmed by externally generated signals on input pins 74. In one embodiment, the programming adjusts the feedback voltage Vfb in order to set Vout.

FIG. 5A illustrates one method for supplying a programmable output voltage of the PSE 75. In FIG. 5A, the programming signals on pins 74 enable different voltage converters 76, 77, 78, which may include any combination of step-up and step-down converters, for outputting the desired voltage. A hot-swap switch 80 is shown, which allows the PSE 75 to be connected into a "hot" PoE-enabled Ethernet bus or other power bus without any significant in-rush current to avoid transients on the bus.

FIG. 5B illustrates another method for supplying a programmable output voltage of the PSE 81, where any number of voltage sources 82, 83, and 84 may be connected in series via programmable switches 85, 86, and 87 by signals applied to pins 74.

In FIGS. 4, 5A, and 5B, the adjustable-output converters may instead be incorporated in PDs to programmably adjust the converters' output voltage for a certain PD load. In such a case, the PD power supplies need not be replaced when replacing a PD load requiring another operating voltage. The output voltages of the PD converters may be programmably adjustable to be, for example, 12 volts, 5 volts, and 3.3 volts. The adjustable converters will typically be step down converters.

In another embodiment, the converters in both the PSEs and the PDs are programmably adjustable.

Hot-Swap Switch in PSE or PD

If multiple PSE's are connected to a PoE-enabled Ethernet bus or other power bus, they ideally should be able to be replaced without powering down the system. When a new PSE is then connected to the bus, there should not be any significant transient in the power path. Further, for PoE systems, for example, the IEEE standards set a limit on the current that can be supplied by the PSE. That current limit is about 400 mA for a Type 1 PSE and about 825 mA for a Type 2 PSE. The PD in-rush current must not exceed those limits or else the PSE is required to stop providing power to the bus.

Figure 6:
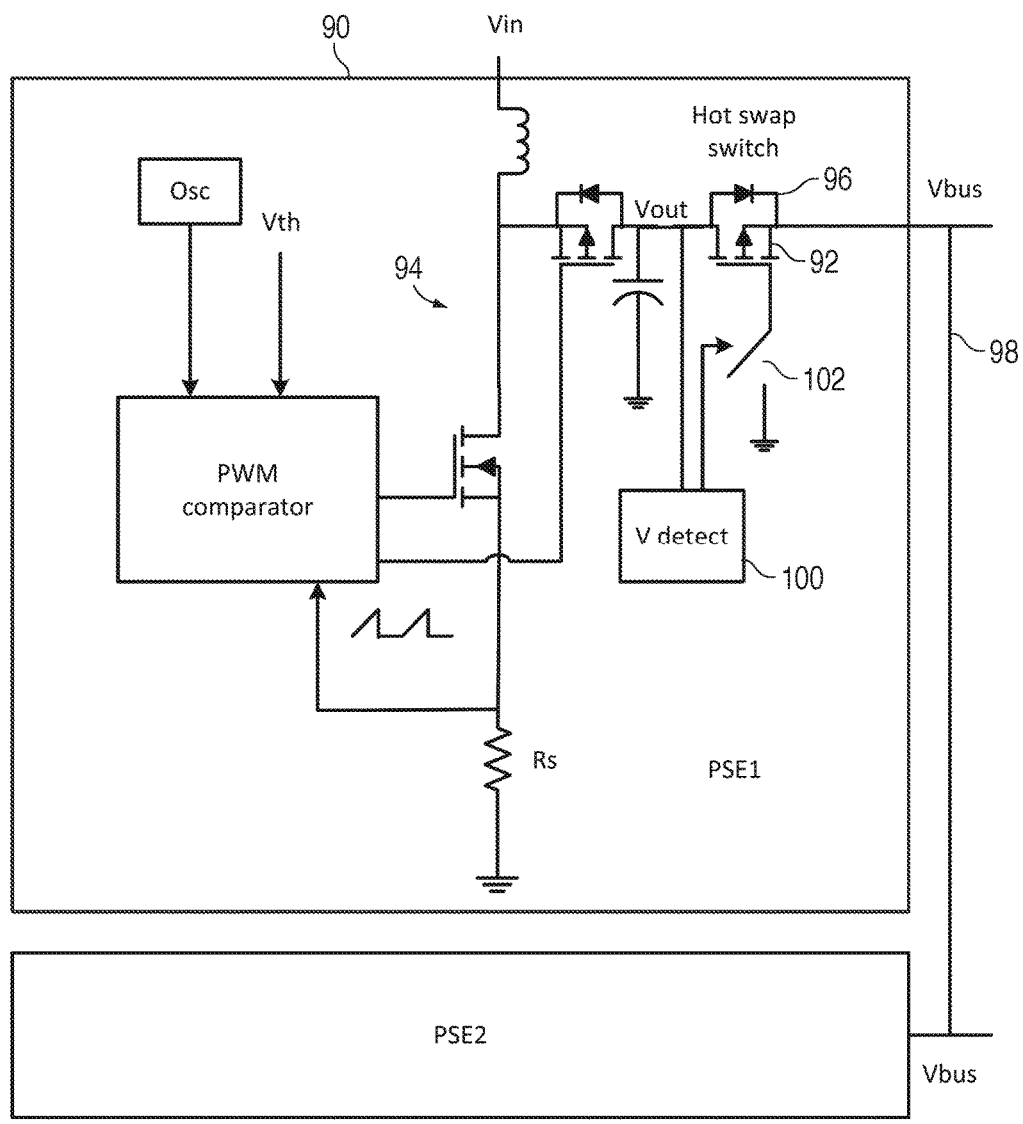
FIG. 6 illustrates a PSE or PD with a controllable hot-swap switch that is closed once the converter in the PSE or PD has ramped up to approximately the power bus voltage to avoid in-rush currents.

FIG. 6 illustrates a PSE 90 with a controllable hot-swap switch 92 (a p-channel MOSFET) that is closed once the converter 94 output voltage Vout has ramped up to approximately the bus voltage Vbus to avoid in-rush currents. For PoE, that bus voltage may be about 44 volts. The converter 94 may be the same as that shown in FIG. 3. The feedback circuit of FIG. 3, connected to sense Vout, is not shown in FIG. 6 for simplicity. In one embodiment, the power supply is a 12 volt battery in an automobile and the system is a PoE-enabled Ethernet system, so the converter 94 is a boost converter for supplying at least the 44 volts PoE minimum voltage.

The body diode 96 of the hot-swap switch 92 and the open state of the switch 92 block current flow between the bus 98 and the converter 94 until the Vout is approximately equal to the bus voltage Vbus. This is detected by a voltage detector 100, such as a comparator or other circuit. When Vout is equal to Vbus, the voltage detector 100 closes a switch 102 to supply a ground voltage to the gate of the switch 92 to cause the switch 92 to conduct and couple the Vout terminal to the bus 98.

A similar arrangement may be provided for hot-swapping PDs onto a PD load power bus. In such a case, multiple PD power supplies may be used to power a single PD load. The PD power supply only is coupled to the PD load power bus when that PD power supply is generating a voltage about equal to the power bus voltage. This prevents the PD power supply from pulling down the PD power bus voltage due to in-rush currents.

PSE Senses Actual Voltage at PD

The IEEE standards for PoE require, for example, that at least 37 volts be supplied at the PD. Other voltage standards may be set in the future. Therefore, the PSE must supply greater than 37 volts to ensure that, despite a worst case voltage drop along the cable, the voltage at the PD will not go below 37 volts. Providing anything more than 37 volts at the PD may be inefficient. The voltage drop is affected by the length of the Ethernet cable or bus, which is unknown to the PSE. It would be desirable to adjust the PSE output voltage such that the voltage at the PD is slightly greater than 37 volts to maximize efficiency.

Figure 7A:
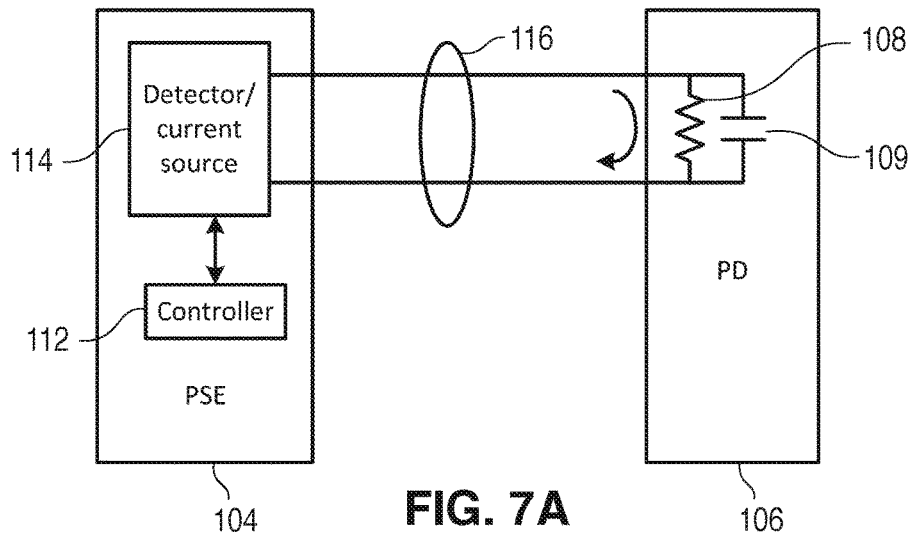
FIGS. 7A and 7B illustrate a technique for allowing the PSE to determine the actual voltage at the PD.
Figure 7B:
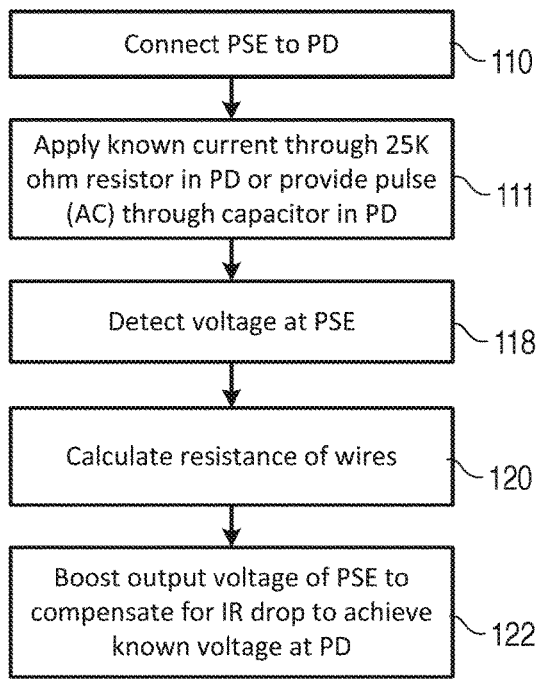

FIGS. 7A and 7B illustrate a technique for allowing the PSE 104 to determine the actual voltage at the PD 106. The technique may be performed during the handshaking phase. Although the technique is described with respect to an Ethernet system, the technique can be applied to any system where power is applied over data lines.

PoE-enabled PDs have a 25K ohm resistor 108 across the PoE terminals to allow the PSE to detect that the PD is PoE-enabled during the detection phase of the handshaking protocol. The PD's may also have a capacitor 109 with a known value coupled across the PoE terminals.

In step 110 of FIG. 7B, the PSE 104 is connected to the PD 106.

In step 111, a controller 112 in the PSE 104 controls a detector/current source circuit 114 to supply a known low current (e.g., 100 mA) through the PoE wire pairs 116. The resulting voltage across the wire pairs 116 at the PSE 104 will be the current multiplied by the combined series resistance of the resistor 108 and the wire pairs 116. However, the resistor 108 to wire resistance ratio may be too high to get an accurate detection of the added resistance by the wires. An alternative technique is to generate a current pulse (an AC signal) by the circuit 114. The capacitor 109 across the PoE terminals of the PD 106 conducts the AC signal with a very low impedance, which makes the ratio of the capacitor impedance to the wire impedance low. This enables a more accurate detection of the wire resistance. The resulting voltage at the PSE is then detected (step 118). Since the impedance of the capacitor 109 in response to the pulse is known, the contribution of resistance by the wires can be determined using Ohm's Law. The resistance of the wire pairs 116 is then determined in step 120. Thus, the actual voltage drop along the wire pairs 116 may now be determined at any current level (V=IR). The resistance or voltage drop is then stored in a memory in the PSE 104.

In step 122, the PSE 104 adjusts its voltage converter (e.g., a boost converter) to compensate for the actual voltage drop along the wire pairs 116 at the present current level or at the maximum current level allowed for the PD type. The result is an increased efficiency due to the PSE 104 not supplying excess voltage at the PD 106. The PD usually switches out the 25K ohm resistor after the handshaking phase to reduce power loss.

In future PoE systems, the 25K ohm resistor 108 may be eliminated or changed, but there will still be some known input impedance (e.g., due to a known capacitance) associated with the PD. In such cases, the above-described technique is modified to take into account the actual input impedance of the PD when determining the voltage drop along the wires between the PSE and PD.

The above technique applies to non-PoE systems as well, where a voltage drop test is initially performed followed by adjusting the output voltage of the PSE to improve efficiency.

If the voltage applied to the PD is close to the voltage needed by the PD load, a LDO regulator may be used in the PD. For low currents, such an LDO regulator may be more efficient than a switching regulator. The voltage supplied to the PD may be any voltage level if there is no requirement to comply with IEEE standards specifying voltage levels.

Use Low Current from PSE During Handshaking Phase to Perform Non-Standard Operations by the PD The IEEE PoE standards require certain low current operations be performed during the PSE-PD handshaking phase. A similar handshaking protocol may also be standardized for non-Ethernet systems using power over data lines. While the PSE is supplying the low current signals during the handshaking phase, such low current signals may also be used for additional functions by the PD. The handshaking protocol may be unaffected.

Figure 8A:
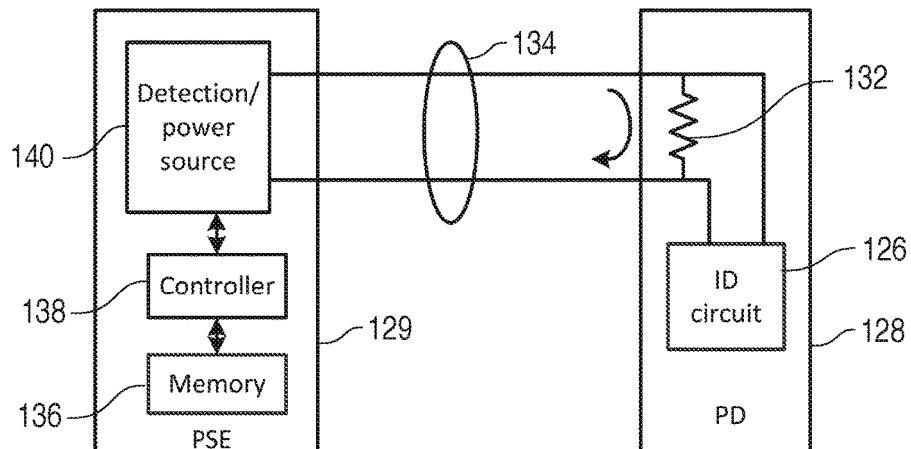
FIGS. 8A and 8B illustrate a technique for using the low current during the handshaking phase to detect signature information in an ID circuit in the PD to identify pertinent characteristics of the PD or to start up other low power circuitry in the PD.
Figure 8B:
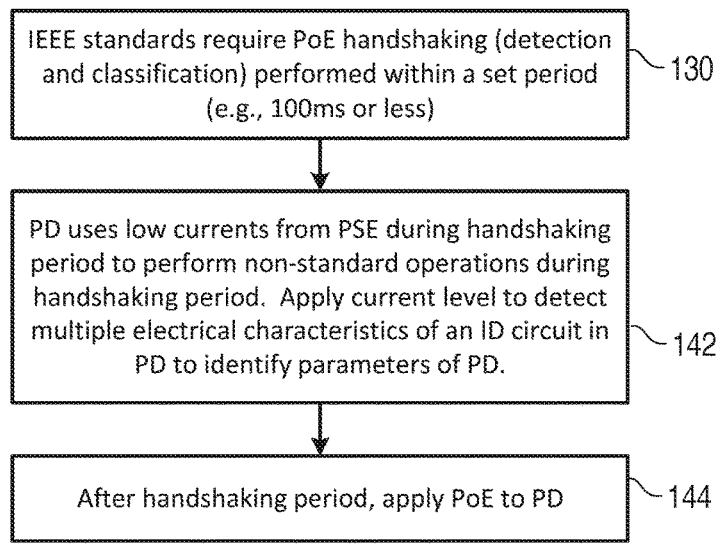

FIGS. 8A and 8B illustrate a technique for using the low current during the handshaking phase to detect signature information in an identification (ID) circuit 126 (or other circuit) in the PD 128 to identify pertinent characteristics of the PD 128. The additional functions may all be performed within the allowable handshaking period set by any IEEE standards (step 130 in FIG. 8B). Alternatively, or in addition, the low current supplied during the handshaking phase may be used to power up any low power circuit in the PD, such as a data receiver, processor, or memory.

In addition to the conventional detection phase, where the PSE 129 provides a low current to detect the presence of the 25K ohm resistor 132 across the wire pairs 134 (assuming a PoE-enabled system), the PD 128 uses some of the current to address or otherwise detect information in the ID circuit 126 (such as a memory circuit or an analog circuit). The ID circuit 126 may be high impedance so as not to affect the detection of the 25K ohm resistor 132 by the PSE 129. The information provided by the ID circuit 126 is then transmitted over the wire pairs 134 and stored in a memory 136 in the PSE 129. The process is controlled by a controller 138, controlling detection and power source circuitry 140.

The ID circuit 126 may instead be any other low current circuit where it is desirable to start up the circuit during the low current handshaking phase rather than wait for the PD to become fully operational. For example, the circuit 126 may be a processor that is booted up during the handshaking phase so it is ready as soon as full power is supplied by the PSE to the PD.

Any other non-standard operation using the low current PSE 129 signals are also envisioned (step 142). The information obtained from the PD 128 may identify any class of the PD, any current levels needed, or other information that may be of use by the PSE 129, such as for budgeting power.

In step 144, the handshaking phase is completed and the PSE 129 provides the PoE (or other power) to the PD 128.

In controlled communication systems, such as in an automobile, where only compatible components are provided by the automobile manufacturer or are designated, there is no need for the full handshaking protocol, such as identified by the IEEE PoE standards. The IEEE PoE standards for handshaking are designed to avoid supplying power to incompatible PDs. If it is assumed that the PDs are already PoE compatible (or compatible with another system used by the automobile) and their characteristics are known, the full handshaking period may be used for obtaining any information from the PD (via digital or analog signals). If the ID circuit 126 is an analog circuit, the information may be conveyed by a resistance value, a current value, a voltage value, an RC time constant, etc.

Delete Detection Phase of Handshaking if Controlled System

In the case of an automobile electrical system or other system where the selection of the components are tightly controlled, it would already be known whether the components are compatible or incompatible with receiving power over the data lines. In such a case, the detection step in the handshaking protocol may be deleted. Therefore, the handshaking phase may be abbreviated or dispensed with all together. In one embodiment, the handshaking protocol only includes a low current phase that detects a particular signal from the PD identifying the required power of the PD to ensure the PSE can supply the required power to the PD. The low current phase may therefore simultaneously detect the required power level as well as ensure the PD is capable of receiving power over its data lines. This may be required for safety purposes to prevent the PSE from supplying a high current across shorted wires.

Save Handshaking Information in Memory at PSE after the Initial Powering Up of the System Conventionally, the handshaking phase between the PSE and the PD is performed each time the system is powered up or a PD is connected. It would be desirable to speed up the time that the PSE and PD are up and running by obviating the handshaking phase or by only requiring a simpler handshaking protocol.

Figure 9:
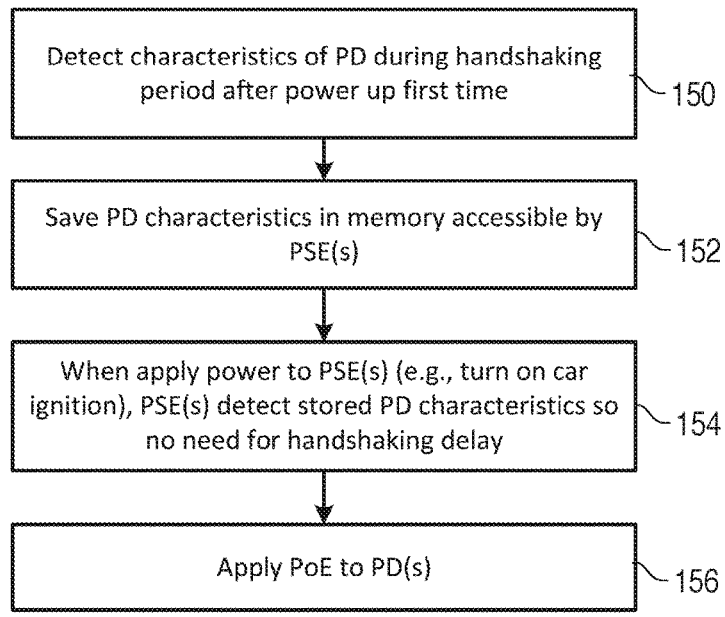
FIG. 9 illustrates a method for storing the PD characteristics in a memory after an initial powering-up to avoid the need for repeating the full handshaking protocol upon subsequent powering-ups.

FIG. 9 illustrates a method for storing the PD characteristics in a memory after an initial powering-up to avoid the need for repeating the full handshaking protocol upon subsequent powering-ups. In the example, it is assumed the system is a PoE enabled Ethernet system, but the technique is applicable to non-Ethernet systems.

In step 150 of FIG. 9, the conventional PoE handshaking routine is performed where the PSE ascertains whether the PD is PoE-enabled and the class/type of the PD.

In step 152, the pertinent PD characteristics (or other characteristics) obtained during the handshaking phase are stored in a memory in the PSE. FIG. 8A illustrates a PSE 129 containing a memory 136 and a controller 138 that may be used for this process as well.

The PSE and PD may now operate normally with the PSE supplying PoE to the PD.

When the Ethernet system is powered down, such as when an automobile is turned off, the PD characteristics remain stored in the memory, which is preferably a non-volatile memory.

In step 154, when power is again applied to the PSE (or multiple PSEs), a controller in the PSE accesses the memory to determine the PoE characteristics of the PD rather than taking the time to perform the conventional handshaking routine. Thus, the handshaking routine is avoided, saving time. The information in the memory may instead allow a simpler and faster detection protocol to be used rather than obviate the detection phase all together.

In step 156, the PSE(s) apply PoE (or other power) to the PD(s) via the data lines.

PSE Provides Low Voltage Signal to PD During a Standby Mode of the PD to Improve Efficiency Many types of PDs are not fully active when powered up but are in a standby mode where only some low power electronic components are powered up. For example, the main load in the PD may not be turned on while a low power controller or processor in the PD is powered so as not to require a time-consuming booting up when the main load is to be turned on. Such low power standby components may only require 5 volts and a few milliamps. If the PSE supplied the full 44 volts (or a non-PoE voltage) to the PD, the PD voltage converter (typically a switching regulator) would be using energy to supply the low power to the standby components for a relatively long time. The converter may even be the largest user of power during standby mode. Since standby periods are typically much longer than the periods when the load is fully on, there is significant total power usage during the standby period.

Figure 10A:
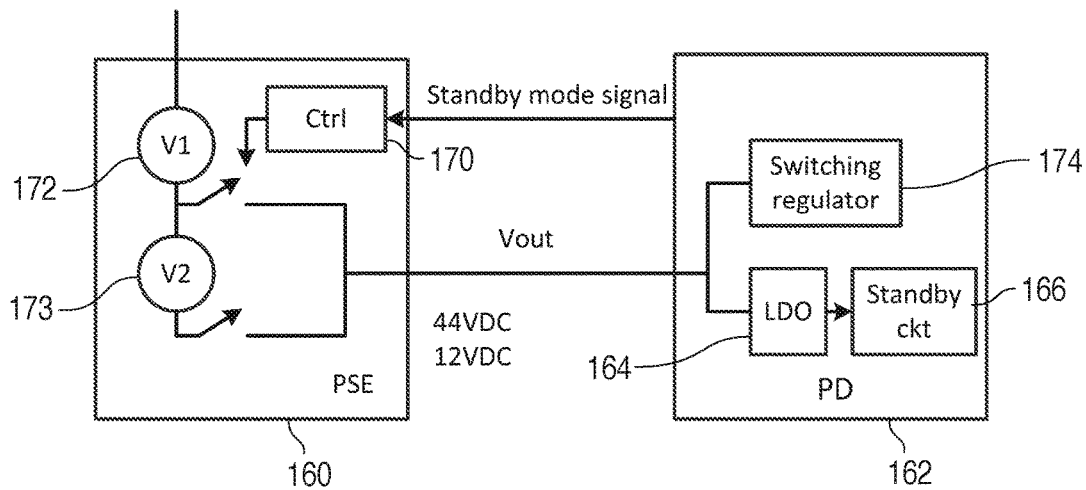
FIG. 10A illustrates the PSE providing a programmable low voltage/power signal to the PD during a low power standby mode of the PD to enable the use of an LDO regulator in the PD to improve efficiency.

FIG. 10A illustrates a PSE 160 providing a low voltage (e.g., 5-12 volts) to the PD 162 during a low power standby mode of the PD 162. In another embodiment, the low power is provided anytime the PD 162 requests the low power; however, a standby mode is given as an example.

In one example, the turning off of the ignition switch causes the automobile's host system to transmit a signal to the PSE 160 to cause the controller 170 to select the low voltage source 172. Alternatively, the controller 170 may adjust the output of a voltage regulator. The voltage supplied by the PSE 160 will be a relatively low voltage (e.g., 5 volts) equal to or slightly higher than what is needed by the PD's standby circuit 166 during the standby mode. The PSE 160 may also command the PD 162 to go into its standby mode, or the low voltage automatically causes the PD 162 to enter its standby mode, or the PD 162 may sense a different signal to enter the standby mode. The host signal or a PD signal may even program the PSE 160 to provide any of a plurality of possible voltages.

When the ignition switch is turned back on, the host may transmit a signal to the PSE 160 to control the PSE to provide the full voltage (e.g., V1+V2), and the PD 162 automatically comes out of the standby mode. The regulated voltage to the higher current load in the PD may then be supplied by a switching regulator in the PD, which is generally more efficient than an LDO regulator at the higher currents and where there is a larger voltage differential.

In an alternative embodiment, the standby mode may be independent of the state of the ignition switch, and the PD 162 generates a standby mode signal that is transmitted to the PSE 160 via any of the Ethernet wire pairs (or other wires if Ethernet is not used) to initiate sending of the low voltage. The controller 170 in the PSE 160 then controls one or more voltage converters or constant voltage sources 172 and 173 to output the low standby voltage (e.g., 5 volts instead of the full 44 volts) on the PoE wire pairs, slightly more than required by the standby mode circuit 166.

The PSE 160 may be powered by an automobile battery or other power source, and the converters or sources 172/173 may be step up or step down devices. Only one voltage converter may be needed to generate both the full voltage and the low voltage by changing a reference voltage or feedback voltage in the converter.

The standby voltage may be programmable by the PD signal, or by programming pins of the PSE 160, or by any other means. Since there is low power, the voltage regulation in the PD 162 during the standby mode may be performed by an efficient LDO regulator 164. Since the LDO regulator 164 does not switch but just controls a resistance element (e.g., a series MOSFET), the LDO regulator 164 is much more efficient than the switching regulator 174 at such low power. The higher power switching regulator 174 in the PD 162 is turned off or in a sleep mode to prevent high frequency switching during the standby mode to save power. Accordingly, efficiency is improved.

When the standby mode is ended, either signaled by the host system or the PD 162, a control signal is sent to the PSE 160 and the full 44 volts is sent to the PD 162. The switching regulator 174 then regulates the voltage for the higher power load. The system may be used with any non-PoE systems where power and data are delivered over the same lines.

Figure 10B:
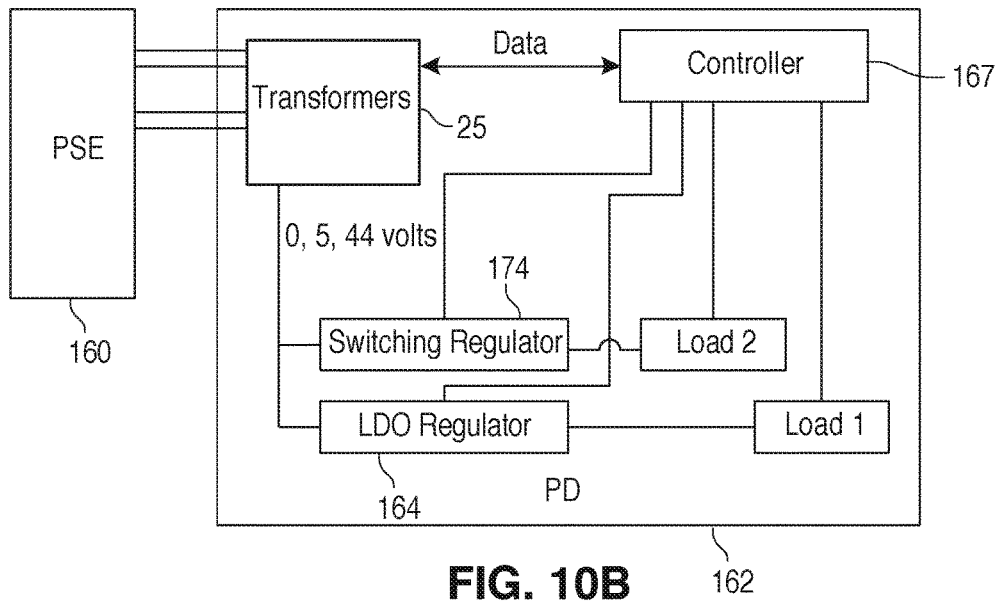
FIG. 10B provides more detail of the PD of FIG. 10A in one embodiment.

FIG. 10B illustrates more detail of one embodiment of the PD 162 of FIG. 10A, where the PD 162 is part of an automobile and includes multiple load components, such as load 1 and load 2, where load 1 may be a processor or other circuit that has a low power mode and requires a voltage lower than that required by load 2. Load 1 may be active while the automobile ignition is on or off, while both loads 1 and 2 may be active when the ignition is on. Load 2 may be a safety device, a video device, a GPS system, a console controller, an entertainment system, or any other device.

Figure 10C:
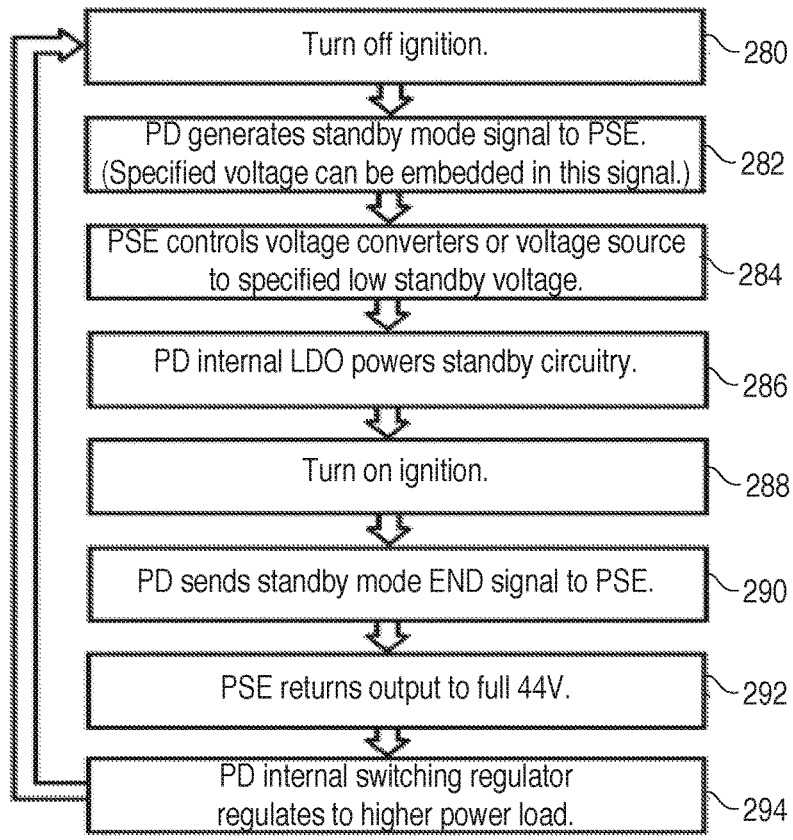
FIG. 10C is a flowchart of an embodiment, where the PSE of FIG. 10B is used in an automobile.

FIG. 10C is a flowchart that shows various steps performed by one embodiment of the PoE system.

A controller 167 in the PD 162 may sense by a data signal on the Ethernet wires, or by the low voltage transmitted by the PSE 160, or by a host system signal that the ignition switch is off (step 280). If the PSE 160 is controlled by the PD 162, the controller 167 sends a data signal to the PSE 160 to only transmit a voltage of, for example, 5 volts rather than the full voltage of 12 or 44 volts, since the PD 162 is in a standby mode and only load 1 needs to be powered (step 282). The required voltage to be generated by the PSE 160 may be embedded as a digital code in the data signal transmitted by the controller 167, and the PSE 160 may control one or more voltage regulators or voltage sources to provide the requested voltage (step 284). Alternatively, the host system controls the PSE 160 to output the low voltage, and the controller 167 senses the low voltage and controls the PD 162 to enter the sleep mode. The controller 167 controls the LDO regulator 164 to be on to power the standby circuitry (step 286) and controls the switching regulator 174 to be off, thus saving power. Since the load 1 may require only about 3 volts at a low current, the LDO regulator 164 is very efficient. The load 2 does not receive any power in the standby mode.

After the controller 167 senses that the ignition has been switched on (step 288), such as by the PSE 160 transmitting the full voltage or receiving another type of signal, the controller 167 wakes up the PD 162 to terminate the standby mode.

In the event that the PD 162 controls the PSE 160 to transmit the low or high voltage, the controller 167 sends a "standby END" signal to the PSE 160 (step 290) to cause the PSE 160 to transmit the full voltage of, for example, 12 or 44 volts (step 292). The controller 167 turns on the switching regulator 174 to power load 2 (step 294), and the LDO regulator 164 may continue to power load 1. Efficiency is not as important when the automobile is running, since the automobile is likely recharging the battery with an alternator. The switching regulator 174 output may also be connected to the power input of load 1 at this time if load 1 requires the same voltage as load 2.

The request to the PSE 160 for the lower voltage may be communicated in ways other than through the Ethernet wires. For example, the PSE 160 may be programmed to automatically deliver the low voltage when the ignition switch is off. In another embodiment, the PSE 160 has programming terminals that receive digital codes, from any source, including the host system, that specify at least the lower voltage level. The digital codes may be generated dynamically, depending on the operation of the automobile, or may be provided only during the initial programming of the PSE.

A plurality of PDs may share the same data and power bus and may make use of the low voltage (standby mode) on the bus while the ignition switch is off, or when the automobile is not in operation. For example, all the PDs in the automobile may use a similar processor that has a low power standby mode so there is no delayed booting up when the ignition is turned on. Using a shared data and power bus reduces wiring and allows a central means of monitoring the status of the various systems. The low voltage may be applied any time the PDs request it.

The system may conform to the relevant IEEE standards.

The invention may also be applied to non-automobile applications and for any application where there is a benefit in the PSE supplying less than its full voltage.

Technique to Determine Whether there are No PDs Connected to Bus or Whether there are One or More PDs Connected to Bus by Detecting an Impedance on the Bus In the conventional detection phase of PoE, the PSE supplies a low current and determines whether the PD has a 25K ohm resistor across the wire pair. If so, this signifies that the PD is PoE-enabled. However, if an Ethernet bus is used and any number of PDs may be connected to the bus, their 25K ohm resistors will be connected in parallel and present a combined low resistance. This low resistance will be below the allowable resistance specified by the IEEE standards for designating a PoE-enabled PD. This premise is presented in step 176 of FIG. 11.

Figure 11:
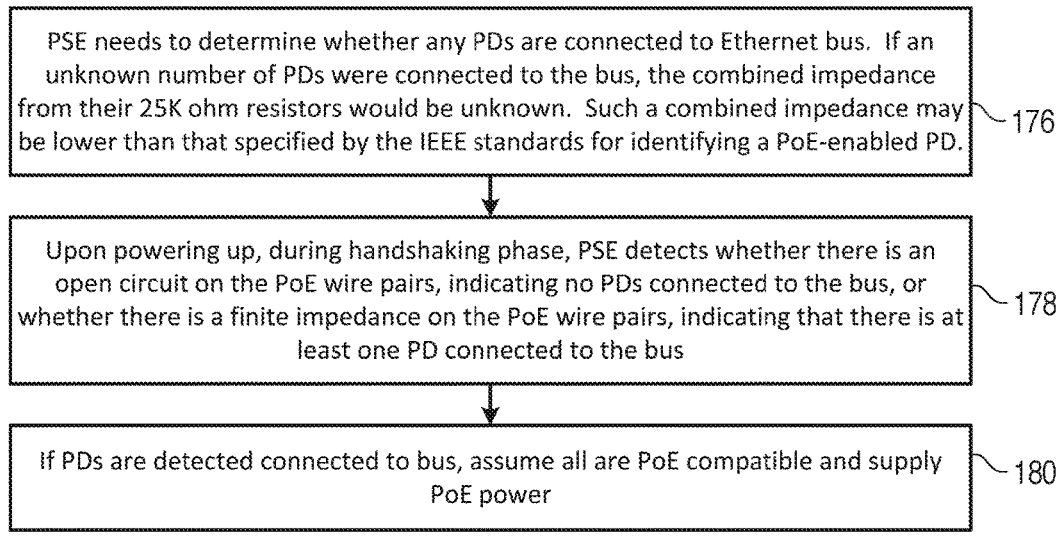
FIG. 11 illustrates a technique where a PSE connected to a power bus can determine whether no PD is connected to the bus or whether an unknown number of PDs are connected to the bus.

FIG. 11 illustrates a technique where the PSE may determine whether there are any PoE-enabled PDs connected to an Ethernet bus. In a controlled application, such as an automobile application, it would be known that either all PDs connected to the bus are PoE-enabled or all PDs connected to the bus are not PoE-enabled. If the PDs are PoE-enabled, they will each have the 25K ohm resistor across the wire pairs. If there are no PDs or the PDs are not PoE-enabled, they will present an open circuit during the detection phase.

In step 178 of FIG. 11, during the detection phase, the PSE supplies a low current to the PoE wire pairs and detects either an open circuit or some impedance greater than zero. If an open circuit is detected, the PSE will not supply any power. If an impedance greater than zero is detected, the PSE assumes that all of the PDs connected to the bus are PoE-enabled, and the PSE applies the PoE to the bus (step 180).

This technique applies to non-PoE systems as well where a PD impedance is used to determine whether a PD is connected to a bus. In such non-PoE systems, the existence of no PDs on the bus is determined by detecting a very high impedance, and the existence of one or more PDs on the bus is determined by detecting an impedance equal to or less than the impedance of a single PD.

Technique to Determine Whether there are No PDs Connected to Bus or Whether there are One or More PDs Connected to Bus by Detecting Collisions on the Bus In another technique for detecting whether there are one or more PDs on an Ethernet bus or other bus is to detect whether there are any collisions on the bus during the handshaking phase or during normal operation. If the PSE generates signals on the bus for reception by any PDs on the bus, and the signals from the one or more PDs on the bus are consistent with a single PD, then the PSE knows that there is only one PD on the bus. If there are no return signals, the PSE knows that there are no PDs on the bus. If the return signals are out of the expected range of signals from a single PD due to collisions from multiple PDs, then the PSE knows that there are multiple PDs on the bus. The PSE may then act accordingly by continuing with any handshaking protocol or ceasing any handshaking protocol.

Despite the initial collisions, the PDs and PSE may still eventually communicate since collision avoidance protocols may then occur, such as the various PDs and/or PSEs being controlled to randomly stagger their respective signals over the bus.

Provide Power, Such as PoE, Using Only One Twisted Wired Pair of the Cable

In some applications, a grounded chassis or ground wire already exists. Therefore, it may be more economical for the PSE to not apply the ground voltage over a wire pair in the Ethernet cable.

Figure 12:
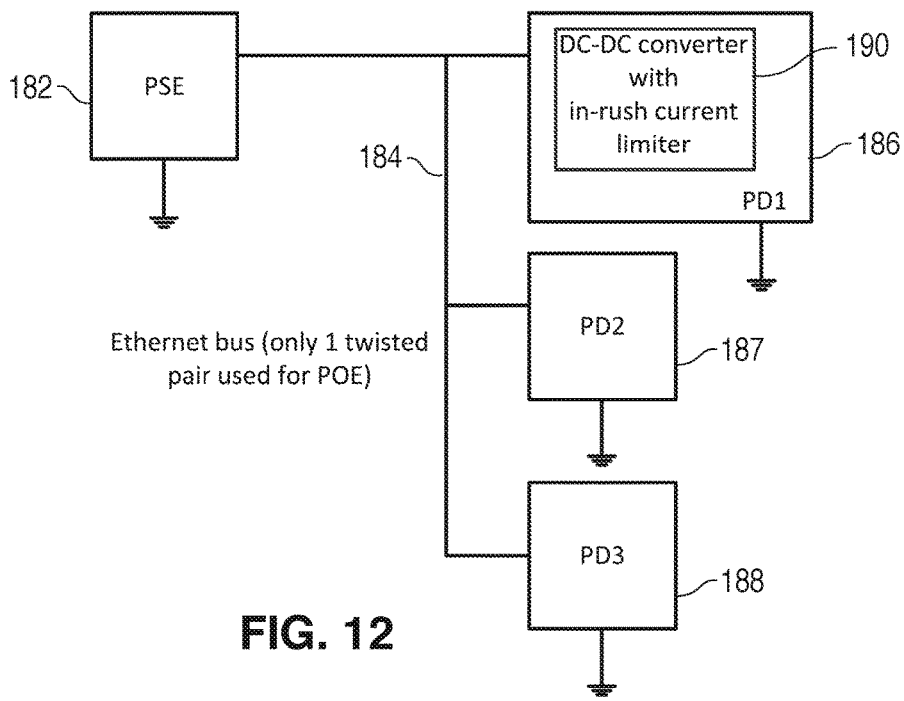
FIG. 12 illustrates a PSE connected to a power bus and multiple PDs connected to the bus, where the power (e.g., PoE) is provided over one twisted wire pair in the cable and an external conductor.

FIG. 12 illustrates a PSE 182 connected to an Ethernet bus 184 and multiple PDs 186, 187, and 188 connected to the bus 184, where the PDs 186-188 include a converter 190 that has an in-rush current limiter for hot-swapping of the PDs. The positive voltage of the PoE is provided over one twisted pair of the Ethernet cabling, and the ground voltage is provided over an external conductor. The external conductor may be the metal chassis of an automobile or an external wire. The PDs 186-188 have connectors that connect to the grounded conductor.

This technique applies to non-PoE systems as well where a PD receives power via one or more data lines.

Security Technique for PD to Ensure it has Performed Proper Handshaking Procedure A PD may be quite valuable, such as a car radio or GPS device. Therefore, it is desirable to provide a security feature to reduce the desirability of stealing the PD from the automobile.

Figure 13:
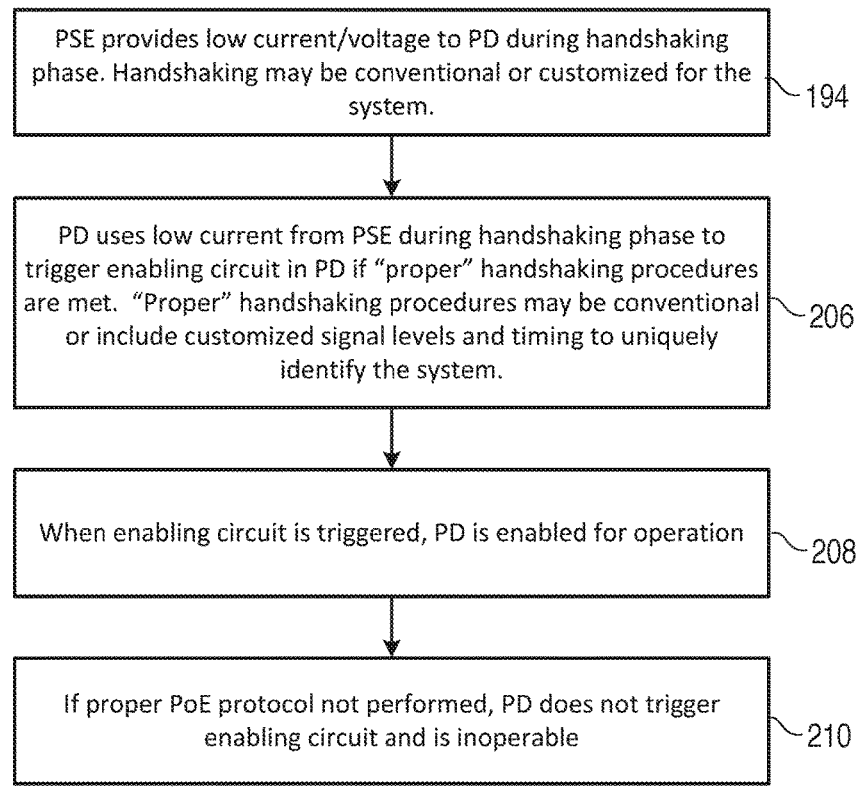
FIGS. 13 and 14 illustrate a security technique wherein, only if a proper PoE protocol or other standard protocol is performed is an enabling circuit in the PD triggered for allowing the PD to operate.
Figure 14:
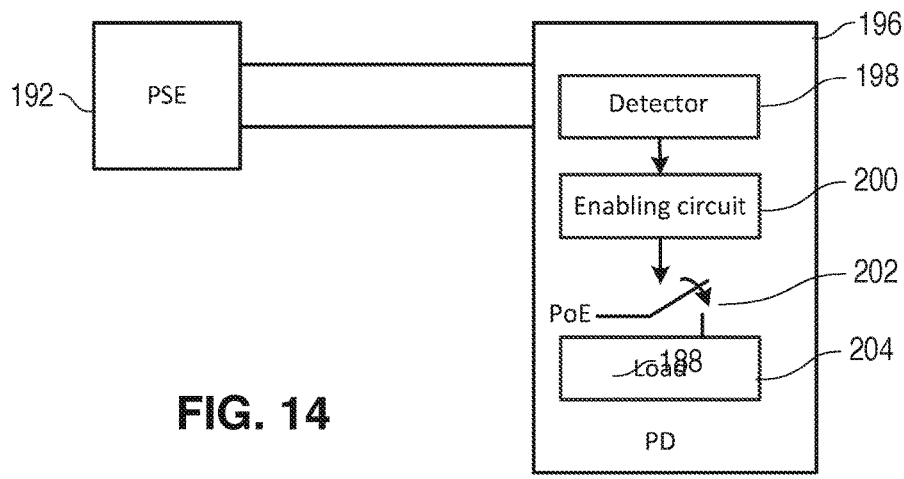

FIGS. 13 and 14 illustrate a security technique wherein, only if a proper PoE protocol (or other protocol) is performed is an enabling circuit in the PD triggered for allowing the PD to operate. The PSE 192 in FIG. 14 may be conventional.

In step 194 of FIG. 13, the PSE 192 provides the conventional low current to the PD 196 (FIG. 14) during the handshaking phase. The handshaking may be the conventional detection/classification protocol or a non-standard protocol.

A detector 198 in the PD 196 senses the low current and uses that power to trigger an enabling circuit 200 (such as a latch). The enabling circuit 200 closes a switch 202 that then connects the PD's voltage converter (or the PoE directly) to the load 204. As shown in step 206, the detector 198 may even sense that the PSE 192 is using the standard handshaking protocol or a customized protocol before triggering the enable circuit 200.

In step 208, when the enabling circuit 200 is triggered, the PD 196 is enabled for normal operation.

In step 210, if the detector 198 does not sense the required handshaking routine, such as if 12 or 44 volts were directly applied to the power input pins of the PD 196, indicative of the PD being used in an unauthorized system, the open switch 202 causes the PD to be inoperable.

This technique applies to non-PoE systems as well, where a PD receives power via one or more data lines and there is a low current handshaking routine used to identify the components.

Figure 15:
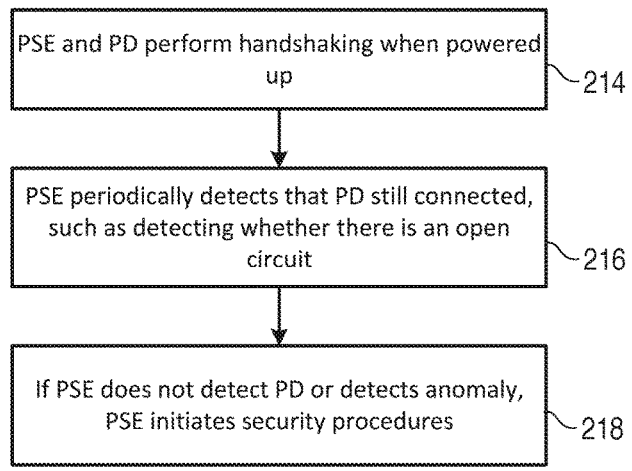
FIG. 15 illustrates a security technique that periodically detects whether a PD is connected to the PSE, either before the PD is powered up or after it is powered up and, if not, then initiates a security routine.

Security Technique to Ensure PD Still Connected in System Before or after Powering Up There is a possibility that a PD may be stolen or inadvertently disconnected from the Ethernet system before being powered or while being powered. FIG. 15 illustrates a security technique that periodically detects whether a PD is still connected to the PSE after powering up and, if not, then initiates a security routine. The routine may also be applied prior to the PD's being powered up.

In step 214 of FIG. 15, upon the PSE and PD being powered up, a conventional handshaking routine is conducted and PoE is applied to the PD. The PSE then provides the power needed by the PD.

In step 216, periodically, such as every 20 seconds, the PSE performs a routine that detects if the PD is an open circuit, or if no power is being drawn, or any other anomaly. This step may also be performed prior to the PD being powered up.

In step 218, if the PSE detects such an anomaly before or after powering up, the PSE initiates a security routine, such as a warning to the driver or an alarm.

This technique applies to non-PoE systems as well, where a PD receives power via one or more data lines and there is a detection signal used to determine whether the PD is still connected to the PSE.

PD has Standby Power Path to Low Power Components and High Power Path to High Power Components It is common for a PD to have a low power standby mode, as previously described, so that time is not wasted booting up when the PD comes out of the standby mode and draws a much higher current.

The DC-DC converter in the PD, which is typically a switching converter, is inefficient when supplying a low power due to the high frequency switching losses. For standby modes, it is known to provide a switching converter with a sleep mode, where the switching stops and the output capacitor supplies the current to the load. When the capacitor voltage goes below a threshold, the switching converter turns on for a short time to charge the capacitor back to a starting voltage. A hysteresis comparator is used to keep the output voltage within two limits. Switching converters with a sleep mode are well-known and conventional and need not be further described.

Figure 16:
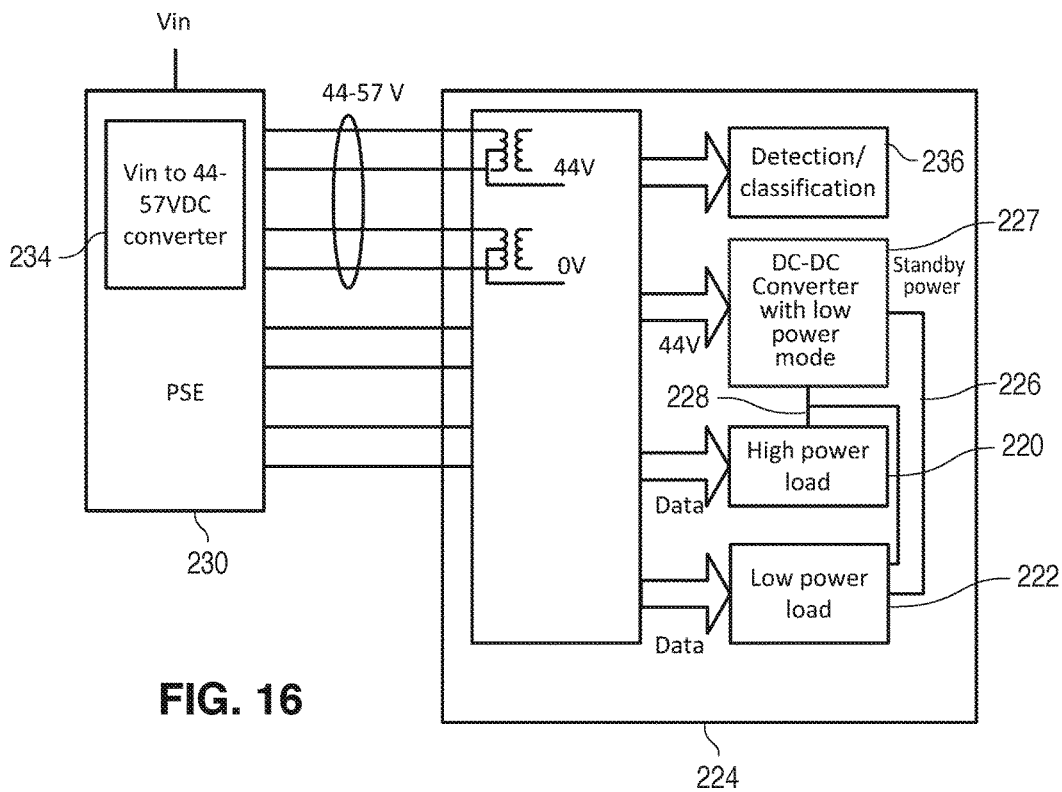
FIG. 16 illustrates a technique for the PD to provide a dedicated standby power path to low power components in the PD and provide a separate high power path to the load when the PD comes out of the standby mode.

In the example of FIG. 16, the high power load 220 is separate from the low power load 222 in the PD 224. The standby (or sleep) mode power path 226 from the converter 227 to the low power load 223 is separate from the high power path 228 from the converter 227 to the high power load 220. This is so that the high power load 220 does not receive any power during the low power mode. The low power load 222 may instead receive power from a separate converter such as an LDO regulator.

The PSE 230 may receive a signal from the PD 224 initiating a standby mode, or the PSE 230 may transmit a signal initiating the standby mode, or the standby mode is only communicated within the PD 224. The PSE 230 continues to provide normal PoE power to the converter 227. As a result of the standby mode occurring, the converter 227 goes into its sleep mode, which may be automatic or triggered, and only the low power path 226 conducts the current to the low power load 222. A switch may be provided at the output of the converter 227 to connect the output terminal to either of the two paths. In this way, the high power load 220 does not draw current.

When the PD 224 comes out of the standby (or low power) mode, the converter 227 operates in its normal switching converter mode, and the output of the converter 227 is switched to the high power path 228 to power the high power load 220 and the low power load 222.

In another embodiment, the PSE or PD sends a data signal to the low power load 222 to wake up prior to the high power load 220 turning on so that no time is wasted for any booting up time of the low power load 222.

FIG. 16 also shows the voltage converter 234 in the PSE 230 providing the standard PoE power. The conventional or customized detection/classification circuitry 236 is shown in the PD 224.

This technique applies to non-PoE systems as well, where a PD receives power via one or more data lines.

Fast Collision Detection on Bus

When multiple devices are connected to an Ethernet bus or other data bus, it is common for multiple devices to transmit at the same time. Such data is corrupted by the collision of the data on the bus. Various techniques are conventionally used to detect collisions and to stagger the retransmissions. One way of detecting a collision is for all transmissions to require the receiving device to acknowledge receipt of a valid message. If the receipt signal is not generated within a certain time window, the transmitted data is assumed to have been corrupted and the data is then retransmitted. In all these techniques, there is a delay incurred by detecting the collision, followed by authorizing multiple devices to retransmit their messages in a staggered fashion. It is desirable to speed up the collision detection and retransmission process.

Figure 17C:
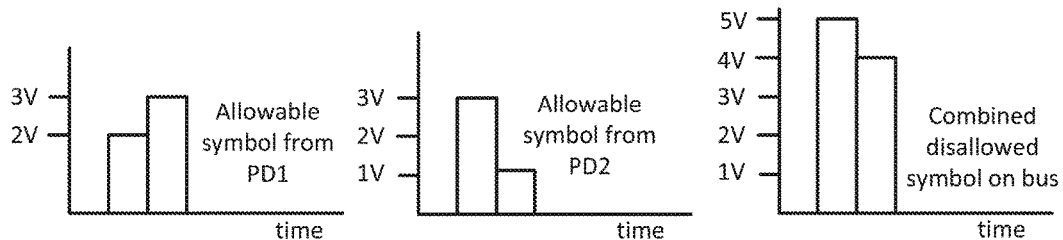

FIGS. 17A, 17B, and 17C illustrate how the signals from multiple PDs 240 and 242 connected to an Ethernet bus 243 or other bus may be summed and the summed signals detected to determine whether a collision has occurred, requiring retransmission. There is no need for any acknowledgment of receipt of a valid message for the system to know that a collision has occurred. Therefore, the retransmission may occur right away.

A set of allowable symbols is stored in a table 244 in each PD. The table 244 communicates with the data physical layer 245 in the PD. There may be any number of allowable symbols. A symbol may be any combination of pulses, where each pulses may have multiple levels, such as 1-5 volts. Therefore, three pulses forming a symbol may convey one of 125 possible symbols. In the example of FIG. 17C, symbols formed by only two pulses are used for simplicity.

In step 246 of FIG. 17B, the PDs transmit allowable symbols on the bus without any collisions. These allowable symbols match the allowable symbols stored in the table 244. The symbols are detected at the PDs and/or PSEs and the appropriate functions are performed.

In step 248, the table 244 also stores disallowed symbols, which are symbols that are not assigned any functions and should not be properly transmitted on the bus 243. Some or all of these disallowed symbols may be the sums of allowable symbols. In an example, a PD generates a pulse of a desired level by supplying a current to the bus 243, and the impedance of the PD on the data line, such as 100 ohms across a twisted wire pair, generates a voltage across the pair. If multiple PDs simultaneously transmit a current, the currents are summed on the bus 243 and create a voltage that is the sum of the intended pulse levels.

The allowed and disallowed symbols are selected such that the various sums of allowed symbols equal disallowed symbols (step 250). For example, FIG. 17C illustrates two allowed symbols being simultaneously transmitted by two PDs: PD1 and PD2. The sums of the pulses in these allowed symbols produce a disallowed symbol formed of a 5 volt pulse and a 4 volt pulse.

In step 252, this disallowed symbol is detected by the table 244, it is ignored by the receiving PD(s), and the occurrence of the disallowed symbol instantly triggers a collision avoidance routine, such as a command to all the PDs to retransmit their data after a random time or in a certain sequence. Thus, the conventional time for detecting a collision and ordering the retransmission is greatly reduced.

FIG. 17A also shows a conventional detection/classification circuit 254, a DC-DC converter 255, and a load 256, connected to the bus 243 via an interface circuit 257.

The above technique is independent of whether the system provides power over data lines.

Fast Control of Bus for Transmission of High Priority Data

As discussed above, when multiple devices are connected to an Ethernet bus or other bus, it is common for multiple devices to transmit at the same time. Such data is corrupted by the collision of the data on the bus. There is a delay incurred by detecting the collision, followed by authorizing multiple devices to retransmit their messages in a staggered fashion. However, in some emergency situations, such a delay becomes very significant and even dangerous. For example, a safety feature in an automobile, such as an air bag controller, may need instant access to the bus to transmit a high priority message.

Figure 18:
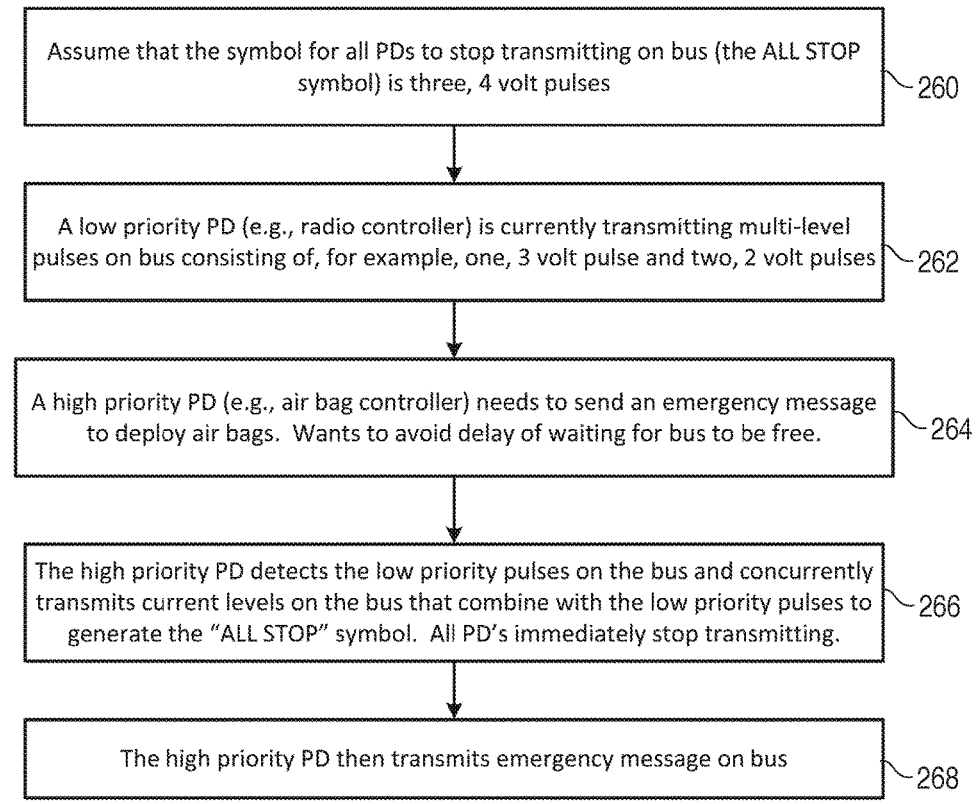
FIG. 18 illustrates a technique for quickly issuing an ALL STOP signal to all PDs on a bus, without having to wait for the bus to be idle, in order to transmit a high priority message on the bus.

FIG. 18 illustrates a technique for quickly issuing an ALL STOP signal (or equivalent command signal) to all PDs on a bus, without having to wait for the bus to be idle after a collision, in order to transmit a high priority message on the bus.

In step 260 of FIG. 18, an ALL STOP command (a symbol), for telling the PDs to not transmit on the bus, is assumed to be a combination of pulses having certain voltage levels. The data need not be digital. In the example, the ALL STOP symbol is three, 4 volt pulses.

In step 262, it is assumed that a low priority PD is currently transmitting multi-level pulses on the bus, such as a symbol consisting of one, 3 volt pulse and two, 2 volt pulses. The low priority message may consist of many symbols.

In step 264, it is assumed that a high priority PD, such as an air bag controller PD, wishes to send a high priority message on the bus and needs all other PDs to stop transmitting. The high priority PD does not want to wait for the bus to be idle.

In step 266, the high priority PD detects the low priority pulses and instantly adds or subtracts the necessary current to/from the pulses on the bus to create the ALL STOP symbol of three, 4 volt pulses. The resulting symbol is detected by all PDs, which instantly terminates all transmission. The bus is now freed up without any collisions and without delay waiting for low priority PDs to complete their transmissions.

In step 268, the high priority PD then transmits the high priority message on the bus.

The above technique is independent of whether the system provides power over data lines.

Any of the features described throughout this entire disclosure may be combined.

While particular embodiments of the present invention have been shown and described, it will be obvious to those skilled in the art that changes and modifications may be made without departing from this invention in its broader aspects and, therefore, the appended claims are to encompass within their scope all such changes and modifications that are within the true spirit and scope of this invention.

What is claimed is:

1. A Power Over Ethernet (PoE) system comprising:
Power Sourcing Equipment (PSE) providing data and voltage over Ethernet wires, the PSE having at least one voltage source for generating at least a first voltage during a first mode of operation and a lower second voltage during a second mode of operation; and a Powered Device (PD) having at least one load, the PD being connected to the PSE by at least the Ethernet wires to receive the data and voltage, the PD having at least one voltage converter for converting at least one of the first voltage and second voltage to a target voltage for the at least one load, wherein the at least one voltage converter in the PD comprises a switching voltage regulator and a linear regulator, wherein, upon a first triggering event occurring, the PSE is configured to provide the first voltage over the Ethernet wires to power the at least one load in the PD and, upon a second triggering event occurring, the PSE is configured to provide the second voltage over the Ethernet wires to power the at least one load in the PD.

2. The system of claim 1 wherein the second voltage is provided to the linear regulator, and wherein the linear regulator provides a regulated voltage to the at least one load in the second mode of operation.

3. The system of claim 2 wherein the first voltage is provided to the switching regulator, and wherein the switching regulator provides a regulated voltage to the at least one load in the first mode of operation.

4. The system of claim 2 wherein the switching regulator is shut down during the second mode of operation.

5. The system of claim 1 further comprising a controller in the PD that generates a digital code transmitted to the PSE, via the Ethernet wires, to specify a level of the first voltage or the second voltage on the Ethernet wires.

6. The system of claim 1 wherein the second voltage is 5 volts or less, and the first voltage is at least 12 volts.

7. A Power Over Ethernet (PoE) system comprising:
Power Sourcing Equipment (PSE) providing data and voltage over Ethernet wires, the PSE having at least one voltage source for generating at least a first voltage during a first mode of operation and a lower second voltage during a second mode of operation;

a Powered Device (PD) having at least one load, the PD being connected to the PSE by at least the Ethernet wires to receive the data and voltage, the PD having at least one voltage converter for converting at least one of the first voltage and second voltage to a target voltage for the at least one load, wherein, upon a first triggering event occurring, the PSE is configured to provide the first voltage over the Ethernet wires to power the at least one load in the PD and, upon a second triggering event occurring, the PSE is configured to provide the second voltage over the Ethernet wires to power the at least one load in the PD; and a controller in the PSE that detects a signal that an ignition switch is off and, in response, controls the PSE to provide the second voltage on the Ethernet wires.

8. A Power Over Ethernet (PoE) system comprising:
Power Sourcing Equipment (PSE) providing data and voltage over Ethernet wires, the PSE having at least one voltage source for generating at least a first voltage during a first mode of operation and a lower second voltage during a second mode of operation; and a Powered Device (PD) having at least one load, the PD being connected to the PSE by at least the Ethernet wires to receive the data and voltage, the PD having at least one voltage converter for converting at least one of the first voltage and second voltage to a target voltage for the at least one load, wherein, upon a first triggering event occurring, the PSE is configured to provide the first voltage over the Ethernet wires to power the at least one load in the PD and, upon a second triggering event occurring, the PSE is configured to provide the second voltage over the Ethernet wires to power the at least one load in the PD, and wherein the PSE includes programming terminals for specifying a value of the second voltage.

9. A Power Over Ethernet (PoE) system comprising:
Power Sourcing Equipment (PSE) providing data and voltage over Ethernet wires, the PSE having at least one voltage source for generating at least a first voltage during a first mode of operation and a lower second voltage during a second mode of operation; and a Powered Device (PD) having at least one load, the PD being connected to the PSE by at least the Ethernet wires to receive the data and voltage, the PD having at least one voltage converter for converting at least one of the first voltage and second voltage to a target voltage for the at least one load, wherein, upon a first triggering event occurring, the PSE is configured to provide the first voltage over the Ethernet wires to power the at least one load in the PD and, upon a second triggering event occurring, the PSE is configured to provide the second voltage over the Ethernet wires to power the at least one load in the PD, and wherein the at least one voltage source in the PSE comprises a plurality of voltage sources generating at least the first voltage and the second voltage.

10. The system of claim 9 wherein the voltage sources comprise a plurality of voltage converters generating at least the first voltage and the second voltage.

11. A Power Over Ethernet (PoE) system comprising:
Power Sourcing Equipment (PSE) providing data and voltage over Ethernet wires, the PSE having at least one voltage source for generating at least a first voltage during a first mode of operation and a lower second voltage during a second mode of operation; and a Powered Device (PD) having at least one load, the PD being connected to the PSE by at least the Ethernet wires to receive the data and voltage, the PD having at least one voltage converter for converting at least one of the first voltage and second voltage to a target voltage for the at least one load;

wherein, upon a first triggering event occurring, the PSE is configured to provide the first voltage over the Ethernet wires to power the at least one load in the PD and, upon a second triggering event occurring, the PSE is configured to provide the second voltage over the Ethernet wires to power the at least one load in the PD; and wherein the PSE and PD are part of an automobile; and
wherein the second mode of operation occurs when an automobile ignition switch is off, and the first mode of operation occurs when the ignition switch is on.

12. A method performed by a Power Over Ethernet (PoE) system comprising:
providing data and voltage over Ethernet wires by Power Sourcing Equipment (PSE), the PSE having at least one voltage source for generating at least a first voltage during a first mode of operation and a lower second voltage during a second mode of operation;

receiving by a Powered Device (PD) the data, the first voltage, and the second voltage via the Ethernet wires, the PD having at least one load, the PD having at least one voltage converter for converting at least one of the first voltage and second voltage to a target voltage for the at least one load, wherein, upon a first triggering event occurring, the PSE provides the first voltage over the Ethernet wires to power the at least one load in the PD, and upon a second triggering event occurring, the PSE provides the second voltage over the Ethernet wires to power the at least one load in the PD;

wherein the at least one voltage converter in the PD comprises a switching voltage regulator and a linear regulator, the method further comprising:

providing the second voltage to the linear regulator such that the linear regulator provides a regulated voltage to the at least one load in the second mode of operation; and, providing the first voltage to the switching regulator such that the switching regulator provides a regulated voltage to the at least one load in the first mode of operation.

13. The method of claim 12 further comprising shutting down the switching regulator during the second mode of operation.

14. The method of claim 12 further comprising the PD requesting, via the Ethernet wires, the PSE to provide either the first voltage or the second voltage on the Ethernet wires.

15. A method performed by a Power Over Ethernet (PoE) system comprising:

providing data and voltage over Ethernet wires by Power Sourcing Equipment (PSE), the PSE having at least one voltage source for generating at least a first voltage during a first mode of operation and a lower second voltage during a second mode of operation;

receiving by a Powered Device (PD) the data, the first voltage, and the second voltage via the Ethernet wires, the PD having at least one load, the PD having at least one voltage converter for converting at least one of the first voltage and second voltage to a target voltage for the at least one load, wherein, upon a first triggering event occurring, the PSE provides the first voltage over the Ethernet wires to power the at least one load in the PD, and upon a second triggering event occurring, the PSE provides the second voltage over the Ethernet wires to power the at least one load in the PD; and the PSE detecting a signal that an ignition switch is off and, in response, the PSE providing the second voltage on the Ethernet wires.

16. A method performed by a Power Over Ethernet (PoE) system comprising:

providing data and voltage over Ethernet wires by Power Sourcing Equipment (PSE), the PSE having at least one voltage source for generating at least a first voltage during a first mode of operation and a lower second voltage during a second mode of operation;

receiving by a Powered Device (PD) the data, the first voltage, and the second voltage via the Ethernet wires, the PD having at least one load, the PD having at least one voltage converter for converting at least one of the first voltage and second voltage to a target voltage for the at least one load, wherein, upon a first triggering event occurring, the PSE provides the first voltage over the Ethernet wires to power the at least one load in the PD, and upon a second triggering event occurring, the PSE provides the second voltage over the Ethernet wires to power the at least one load in the PD, and wherein the at least one voltage source in the PSE comprises a plurality of voltage sources generating at least the first voltage and the second voltage.

17. A method performed by a Power Over Ethernet (PoE) system comprising:

providing data and voltage over Ethernet wires by Power Sourcing Equipment (PSE), the PSE having at least one voltage source for generating at least a first voltage during a first mode of operation and a lower second voltage during a second mode of operation;

receiving by a Powered Device (PD) the data, the first voltage, and the second voltage via the Ethernet wires, the PD having at least one load, the PD having at least one voltage converter for converting at least one of the first voltage and second voltage to a target voltage for the at least one load, wherein, upon a first triggering event occurring, the PSE provides the first voltage over the Ethernet wires to power the at least one load in the PD, and upon a second triggering event occurring, the PSE provides the second voltage over the Ethernet wires to power the at least one load in the PD, wherein the PSE and PD are part of an automobile, wherein the second mode of operation occurs when an automobile ignition switch is off, and the first mode of operation occurs when the ignition switch is on.

* * * * *